United States Patent [19]
Barsotti et al.

[11] Patent Number: 6,146,703
[45] Date of Patent: Nov. 14, 2000

[54] METHOD OF PRODUCING HIGH SOLIDS COATING COMPOSITION AND COATINGS RESULTING THEREFROM

[75] Inventors: Robert J. Barsotti, Franklinville, N.J.; Jeffery W. Johnson, Rochester Hills, Mich.

[73] Assignee: E. I. du Pont de Nemours and Company, Wilmington, Del.

[21] Appl. No.: 08/932,111

[22] Filed: Sep. 17, 1997

Related U.S. Application Data

[63] Continuation-in-part of application No. 08/666,485, filed as application No. PCT/US94/14166, Dec. 21, 1994, abandoned, which is a continuation of application No. 08/175,819, Dec. 29, 1993, abandoned.

[51] Int. Cl.$^7$ ........................................................ B05D 3/02
[52] U.S. Cl. ........................................ 427/385.5; 427/386
[58] Field of Search ................................ 427/385.5, 384, 427/386

[56] References Cited

U.S. PATENT DOCUMENTS

| | | |
|---|---|---|
| 1,993,828 | 3/1935 | Brubaker et al. . |
| 3,607,824 | 9/1971 | Agglas et al. . |
| 3,631,157 | 12/1971 | Vaughn . |
| 3,852,236 | 12/1974 | Heilman . |
| 3,888,943 | 6/1975 | Labana et al. . |
| 3,919,345 | 11/1975 | Labana et al. . |
| 4,091,048 | 5/1978 | Labana et al. . |
| 4,308,363 | 12/1981 | Vaughn . |
| 4,374,954 | 2/1983 | Labana et al. . |
| 4,391,965 | 7/1983 | Falkenburg et al. . |
| 4,681,811 | 7/1987 | Simpson et al. . |
| 4,681,904 | 7/1987 | Yasuda et al. ............................ 523/457 |
| 4,732,790 | 3/1988 | Blackburn et al. . |
| 4,906,677 | 3/1990 | Barsotti et al. . |
| 4,931,509 | 6/1990 | Yagishita et al. . |
| 5,043,220 | 8/1991 | Shalati et al. . |
| 5,206,295 | 4/1993 | Harper et al. . |
| 5,227,243 | 7/1993 | Shalati et al. . |
| 5,418,297 | 5/1995 | Isozaki . |
| 5,428,082 | 6/1995 | Gould et al. . |
| 5,516,846 | 5/1996 | Shalati et al. ............................ 525/207 |
| 5,580,926 | 12/1996 | Shalati et al. ............................ 525/108 |
| 5,602,274 | 2/1997 | Gould et al. . |
| 5,633,020 | 5/1997 | Gould et al. . |
| 5,633,330 | 5/1997 | Gould et al. . |

FOREIGN PATENT DOCUMENTS

| | | |
|---|---|---|
| 2091265 | 11/1992 | Canada . |
| 0 081 163 | 11/1982 | European Pat. Off. . |
| 0 598 131 | 5/1994 | European Pat. Off. . |
| 4 012 301 | 1/1992 | Japan . |
| WO 93 11188 | 6/1993 | WIPO . |
| WO 94 11415 | 5/1994 | WIPO . |

*Primary Examiner*—Shrive Beck
*Assistant Examiner*—Bret Chen
*Attorney, Agent, or Firm*—James A. Costello; Sudhir G. Deshmukh

[57] ABSTRACT

A method for producing coating composition exhibiting sprayability at low VOC and excellent performance characteristics as a coating is disclosed. The composition is based on low molecular weight anhydride resin having pendant non-cyclic anhydride moieties and epoxy resin. The composition includes an active catalyst for controlling the volatility of the coating during cure. The composition also includes a surface tension reducing agent that wets the surface during coating application.

5 Claims, No Drawings

METHOD OF PRODUCING HIGH SOLIDS COATING COMPOSITION AND COATINGS RESULTING THEREFROM

CROSS-REFERENCE TO RELATED APPLICATIONS

This application is a continuation-in-part of U.S. application Ser. No. 08/666,485, filed on Jun. 26, 1996 abandoned, which is a 371 Application of PCT/US94/14166, filed on Dec. 21, 1994 which is a continuing application of U.S. Ser. No. 08/175,819 filed on Dec. 29, 1993, now abandoned.

BACKGROUND OF THE INVENTION

The present invention relates to a method for making a curable coating composition particularly useful as a top coat in multi-layered coating systems. Base coat-clear coat systems have found wide acceptance in the past decade as automotive finishes. Continuing effort has been directed to such coating systems to improve the overall appearance, the clarity of the top coat, and the resistance to deterioration. Further effort has been directed to the development of coating compositions having low volatile organic content (VOC).

Previous efforts at improving the etch resistance and durability of coatings suggested the use of anhydride resins having pendant non-cyclic anhydride moieties in combination with resins that react with the polyanhydride resins to cure under curing conditions. However, a continuing need exists for coating formulations which can be sprayed at exceptionally low VOC and which exhibit outstanding performance characteristics after application, and particularly resistance to environmental etching.

SUMMARY OF THE INVENTION

This invention concerns a method for making a heat-curable coating composition in an organic solvent comprising controlling a) the amount of volatiles produced during cure and b) the surface tension of the coating by admixing:
  i) an anhydride resin having a weight average molecular weight less than about 2000 that contains a central moiety and an average of at least three pendant, non-cyclic anhydride moieties bonded to each central moiety;
  ii) an oligomer having epoxy functionality of at least 2 and a weight average molecular weight less than about 1500;
  iii) a functional amount of at least one tertiary amine catalyst; and
  iv) 0.01 to 5 percent by weight of (i) plus (ii) of a surface tension reducing agent;
the method also comprises:
    employing the catalyst in step (iii) to maintain the weight ratio of actual to theoretical solids above about 95 percent; and
    employing the surface tension reducing agent in step (iv) to maintain the surface tension below about 32 dynes/cm².

The composition made by the method of this invention is a heat-curable coating composition in an organic solvent comprising:
  i) an anhydride resin having a weight average molecular weight less than about 2000 that contains a central moiety and an average of at least three pendant, non-cyclic anhydride moieties bonded to each central moiety;
  ii) an oligomer having epoxy functionality of at least 2 and a weight average molecular weight less than about 1500;
  iii) a functional amount of at least one tertiary amine catalyst; and
  iv) 0.01 to 5 percent by weight of (i) plus (ii) of a surface tension reducing agent.

DETAILS OF THE INVENTION

Anhydride resins which can be used in the present invention are asymmetrical and preferably contain a moiety represented by the following formula:

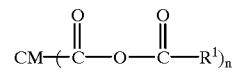

wherein (CM) is a central moiety, ($R^1$) is an organic moiety, and n is a number of pendant anhydride groups.

The central moiety can be a simple organic moiety, such as an aliphatic, cycloaliphatic or aromatic moiety, with a plurality of anhydride groups bonded to it. Alternatively, it can contain a plurality of repeating units which are bonded to one or more pendant anhydride groups. Examples of suitable non-polymeric central moieties are those derived from multifunctional alcohols such as pentaerythritol, trimethylopropane and neopentyl glycol. The multifunctional alcohols are reacted with cyclic, monomeric anhydride such as methyl hexahydrophthalic anhydride to give a multifunctional acid containing moiety. The resulting product is then reacted with ketene to form the linear pendant anhydride.

The central moiety is linked to at least 3 non-cyclic anhydride groups on average. The anhydride equivalent weight (formula weight per anhydride group) is preferably at least 200 and no more than about 1000.

Each anhydride moiety is typically terminated by an organic group ($R^1$). This group is preferably aliphatic and more preferably alkyl. It preferably contains no more than about 6 carbon atoms, more preferably no more than about 4 carbon atoms, and most preferably methyl.

The oligomeric anhydride can optionally contain a polyvalent organic moiety (A) that is linked to a plurality of anhydride groups by a plurality of pendant linking groups (LG), as illustrated in the following formula:

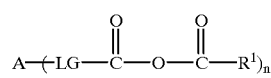

The linking group (LG) can contain, for example, ester linkages, alkylene groups, ether linkages, urethane linkages and combinations of those. The polyvalent organic group can contain, for example, a polyvalent alkyl or aromatic group. The combination of the polyvalent organic moiety (A) and the linking groups (LG) forms the central moiety (CM) as previously described.

The central moiety can optionally contain other functional groups in addition to the pendant non-cyclic anhydride groups. For example, the central moiety can contain pendant acid groups, so that the anhydride is represented by the formula:

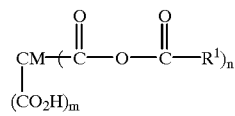

wherein m is the number of pendant acid groups and all other characters have the meaning previously given. The molar ratio of pendant non-cyclic anhydride groups to pendant acid groups in the oligomeric anhydride is preferably at least about 25:75, more preferably at least about 50:50, and more highly preferably at least about 75:25. Most preferably, the anhydride contains substantially no pendant acid groups. The central moiety can also contain minor quantities of cyclic anhydride moieties.

The molecular weight of the anhydride resin is an important feature of the present invention, and should be less than about 2000. At molecular weights of the oligomeric anhydride greater than 2000, it is difficult to attain a sprayable composition with a volatile organic content of less than about 3.0 pounds of organic solvent per gallon of curable compositions. The molecular weight of the anhydride resin is preferably about 400 to 1,000, and the anhydride resin preferably has 3 to 4 pendant, non-cyclic anhydride moieties bonded to each central moiety.

The oligomer component contains at least two epoxy groups and a molecular weight of less than about 1500. Typical epoxy components are as follows: sorbitol polyglycidyl ether, mannitol polyglycidyl ether, pentaerythritol polyglycidyl ether, glycerol polyglycidyl ether, low molecular weight epoxy resins such as epoxy resins of epichlorohydrin and bisphenol-A, di- and polyglycidyl esters of polycarboxylic acids, polyglycidyl ethers of isocyanurates, such as DENECOL® EX301 polyglycidyl ether from Nagase in Japan. Sorbitol polyglycidyl ether, such as DEC-358® polyglycidyl ether from Dixie Chemical in Texas, and di- and polyglycidyl esters of acids, such as ARALDITE® CY-184 polyglycidyl ester from Ciba-Geigy in New York, or XU-71950 polyglycidyl ester from Dow Chemical company in Michigan are preferred since they form high quality finishes. Cycloaliphatic epoxies can also be used, such as ERL-4221 from Union Carbide.

The present compositions contain a functional amount of at least one active catalyst. By functional amount is meant a quantity which will permit a VOC of less than about 3.0 and which minimizes cure volatiles, e.g., acetic acid. While a blend of two or more catalysts can be used in the present compositions, at least one catalyst in the blend should be active below the cure temperature, that is, at least about 15° C. below the normal curing temperature. Particularly beneficial in the present invention are tertiary amine catalysts such as triethylene diamine, bis(2-dimethyl aminoethyl) ether and N,N,N1, N1-tetramethylethylenediamine.

The active catalysts can be used alone or in combination with one or more additional catalysts, such as onium compounds including quaternary phosphonium and quaternary ammonium. Examples of phosphonium catalysts which can be used in catalyst blends in accordance with the present invention are benzyl triphenyl phosphonium chloride; ethyl triphenyl phosphonium bromide; tetra butyl phosphonium chloride; tetra butyl phosphonium bromide; benzyl triphenyl phosphonium iodide; benzyl triphenyl phosphonium bromide; ethyl triphenyl phosphonium iodide and the like.

The compositions of the present invention further comprise about 0.1 to 5 weight percent, of binder components (a) and (b), of at least one surface tension reducing agent in an amount sufficient to wet the surface onto which it is applied. A wide variety of surfactants can be used, depending on the particular coating formulation and the surface onto which it is applied. However, conventional silicone and fluorocarbon surfactants have been found particularly satisfactory.

The coating compositions of the present invention are formulated into high solids coating systems dissolved in at least one solvent. The solvent is usually organic. Preferred solvents include aromatic hydrocarbons such as petroleum naphtha or xylenes; ketones such as methyl amyl ketone, methyl isobutyl ketone, methyl ethyl ketone or acetone; esters such as butyl acetate or hexyl acetate; and glycol ether esters such as propylene glycol monomethyl ether acetate.

The coating compositions of the present invention can also contain conventional additives such as pigments, stabilizers, rheology control agents, flow agents, toughening agents and fillers. Such additional additives will, of course, depend on the intended use of the coating composition. Fillers, pigments, and other additives that would adversely effect the clarity of the cured coating will not be included if the composition is intended as a clear coating.

The composition of the present invention have a volatile organic content of less than about 3.0 pounds of organic solvent per gallon of curable composition, that is, at least about 65 weight percent solids. The coating compositions are typically applied to a substrate by conventional techniques such as spraying, electrostatic spraying, roller coating, dipping or brushing. The present formulations are particularly useful as a clear coating for outdoor articles, such as automobiles and vehicle body parts. The substrate is generally prepared with a primer and or a color coat or other surface preparation prior to coating with the present compositions. The present coating compositions can be applied using conventional techniques such as wet-on-wet applications over solvent borne basecoats, or over dried water borne basecoats. The ability to apply the present compositions by spraying techniques with the unusually low VOC content is surprising.

After application to a substrate, the present compositions are cured by heating to a temperature of about from 125° to 140° C. for a period of about 15 to 90 minutes.

The performance characteristics of the final cured coating composition are excellent, providing a combination of excellent gloss and durability to abrasion, sunlight and acidic rain. At the same time, the compositions provide ease of handling, resulting from all the components being present in a single formulation, good shelf life and low volatile organic content.

The present invention is further illustrated by the following specific examples, in which parts and percentages are by weight unless otherwise indicated.

EXAMPLE 1

A curable coating composition was prepared from an anhydride resin, co-reactant oligomeric epoxy resin, active catalyst and surface tension reducing agent.

(a) Anhydride Resin

The anhydride resin was prepared from a tetra-functional half-acid ester. The following constituents were charged to a reaction vessel equipped with a heating mantle, reflux condenser, thermometer, nitrogen inlet, and stirrer:

|  | Parts by Weight |
| --- | --- |
| Portion 1 | |
| Pentaerythritol | 478.0 |
| Methyl hexahydrophthalic anhydride | 2250.0 |
| Triethylamine | 0.5 |
| Portion 2 | |
| Xylol (135°–145° C.) | 2250.0 |
| Total | 4978.5 |

Portion 1 was charged into the reaction vessel, heated to 180° C. under a nitrogen blanket and held for 30 minutes. After the hold period, the reaction mixture was cooled and Portion 2 added.

The solution prepared above was used to make a linear pendant anhydride. The solution was charged into a 5L flask equipped with a stirrer and a gas inlet tube, the gas inlet tube was attached to a ketene generator similar to the one described by Williams et al. in the Journal of Organic Chemistry 5,122, 1940. Ketene is bubbled through the solution until all of the acid groups have been converted to anhydride groups. Reaction progress was monitored via FTIR. Solvent was then removed under vacuum to give a linear pendant anhydride with the following characteristics:

Percent weight solids: 78.0; Anhydride eq. wt: 329±4 (on solution basis); Acid eq. wt: 6176±1323 (on solution basis).

The resulting linear pendant anhydride was combined with active catalysts and surface tension reducing agent.

Based on 100 parts by weight of the final coating formulation, 55.85 parts of the anhydride resin was first combined with active catalysts and surface tension reducing agent, along with hindered amine light stabilizer and UV screener.

A blend of two catalysts was used, including a tertiary amine catalyst available from Union Carbide as NIAX A99 (1.00 parts) and 1.44 parts of a 25% solution of tetrabutyl phosphonium chloride in propylene glycol monomethyl-ether acetate (PM acetate).

The surfactant added to this formulation was 6.00 parts of a 5% solution in PM acetate of a polysiloxane copolymer commercially available as BYK-301. Also added to this linear pendant anhydride formulation were 1.00 parts of the hindered amine light stabilizer commercially available from Ciba-Geigy as Tinuvin® 292 and 1.40 parts of UV screener commercially available from Ciba-Geigy as Tinuvin® 384.

A second formulation contained the oligomer having epoxy functionality. The material used was 24.05 parts of diglycidyl ester commercially available from DOW as XU-71950. This was combined with 3.53 parts of butyl acetate solvent and 5.73 parts of a rheology control agent. The rheology control agent was silica dispersed in epoxy. The silica dispersion consisted of 38.5 parts of the same diglycidyl ester and 51.5 parts of PM acetate, to which was added 10 parts of a hydrophobic silica commercially available from Degussa as Aerosil R-972®. The silica dispersion was well mixed and subjected to grinding in a sand mill.

The two formulations respectively containing the linear pendant anhydride and oligomer having epoxy functionality were combined in the ratios shown and sprayed onto primed metal panels coated with a basecoat and cured at 285° F. The cured coating exhibited outstanding appearance and durability.

Coating Properties

It has been found that the use of an "active" catalyst minimizes cure volatiles. This factor is important to maintain the highest possible solids. Using a latent catalyst leads to formulation of acetic acid and/or acetic anhydride cure volatiles which can cause health and equipment problems. Another benefit achieved through use of the active catalyst is rapid crosslinking so that the coatings avoid sag problems. This rapid crosslinking during heat cure causes an increase in the viscosity of the coating, thus minimizing the need for rheology control additives to reduce sag. Finally, the surface tension reducing agent allows the paint to "wet" the surface beneath it, usually a basecoat. Without the surface tension reducing agent, the coating would bead-up and/or crawl off the substrate. Flow-control additives that do not significantly reduce surface tension are not useful in the coating compositions of this invention. Because of the low viscosity of the binder components of this coating it is important to reduce flow, not improve it as do common flow additives. Finally, the compositions have preferred viscosities above 150 cps rather than below 100 cps which are common in standard air-spray coatings.

What is claimed is:

1. A method of producing a coating on a substrate, said method comprising:

applying on said substrate said coating from a heat-curable composition in an organic solvent, said composition comprising:

an anhydride resin having a weight average molecular weight less than about 2000 that contains a central moiety and an average of at least three pendant, terminal, noncyclic anhydride moieties bonded to each central moiety, an oligomer having epoxy functionality of at least 2 and a weight average molecular weight less than about 1500, and 0.01 percent to 5 percent by weight based on the weight of said anhydride resin and said oligomer of a surface tension reducing agent for maintaining the surface tension during said application step below about 32 dynes/cm$^2$; and curing said coating wherein said coating composition includes a functional amount of at least one tertiary amine catalyst sufficient to control the amount of volatiles produced during said cure step at a weight ratio of actual to theoretical solids of above about 95 percent.

2. The method according to claim 1 employing as the anhydride resin, the reaction product of pentaerythritol, a methyl hexahydrophthalic anhydride and ketene.

3. The method according to claim 1 employing, as the oligomer, a member selected from the group consisting of glycidyl ethers of polyols, polyglycidyl esters of polyacids, glycidyl methacrylate, glycidyl acrylate containing acrylic polymers, and a mixture thereof.

4. The method according to claim 3 wherein the polyglycidyl ester comprises diglycidyl ester of 1,2-cyclohexane dicarboxylic acid.

5. The method of claim 1 wherein said volatiles include acetic acid.

* * * * *